United States Patent [19]
Inui

[11] Patent Number: 5,473,355
[45] Date of Patent: Dec. 5, 1995

[54] THERMAL PRINTING METHOD AND THERMAL PRINTER

[75] Inventor: Fuyuki Inui, Saitama, Japan

[73] Assignee: Fuji Photo Film Co., Ltd., Kanagawa, Japan

[21] Appl. No.: 75,304

[22] Filed: Jun. 11, 1993

[30] Foreign Application Priority Data

Jun. 11, 1992 [JP] Japan ..................................... 4-152446

[51] Int. Cl.$^6$ .................................................. B41J 2/325
[52] U.S. Cl. ............................................ 347/183; 347/184
[58] Field of Search ...................... 346/76 PH; 400/120, 400/120.07; 358/298; 347/184, 183

[56] References Cited

U.S. PATENT DOCUMENTS

| | | | |
|---|---|---|---|
| 4,851,861 | 7/1989 | Kikuchi et al. | 346/76 PH |
| 5,232,294 | 8/1993 | Inui | 400/120 |
| 5,297,878 | 3/1994 | Saito et al. | 400/120 |
| 5,327,165 | 7/1994 | Elliot | 346/76 PH |
| 5,363,125 | 11/1994 | Inui et al. | 346/76 PH |
| 5,382,965 | 1/1995 | Yamakawa et al. | 358/298 |

*Primary Examiner*—Huan H. Tran
*Attorney, Agent, or Firm*—Birch, Stewart, Kolasch & Birch

[57] ABSTRACT

Half-tone image data and character image data are discriminated from each other with reference to discrimination data, and are stored separately from each other. In accordance with the image to be printed, one of a character print table and a half-tone print table is selected. In accordance with the result of comparison of the character image data with comparison data read from the character print table, characters are recorded using two kinds of character dot print patterns for recording a dot in the whole area of an associated pixel and for recording no dot. Half-tone images are recorded in the area gradation method using half-tone dot print patterns in accordance with the result of comparison of the half-tone image data with comparison data read from the half-tone print table. One pixel is divided into a plurality of sub-lines. The recording of the characters is performed at intervals of N sub-lines, N is an integer. The recording of the half-tone images is performed at intervals of one sub-line.

17 Claims, 9 Drawing Sheets

THERMAL PRINTING METHOD AND THERMAL PRINTER

BACKGROUND OF THE INVENTION

1. Field of the Invention

The present invention relates to a thermal printing method and a thermal printer, and more particularly to a method of printing characters and half-tone images by using a different dot print pattern from each other, and a thermal printer for use with the method as well.

2. Related Art

Thermal printers use a recording head having M recording elements (M is an integer) disposed in a main scan direction to simultaneously record M dots on a recording paper while moving the recording head or the recording paper in a sub scan direction perpendicular to the main scan direction.

Recently, in order to provide a half-tone image, an area gradation method has been proposed, for example, in a commonly assigned U.S. Pat. No. 5,297,878. According to this method, one pixel is divided into N sub-lines (N is an integer), and a half-tone is produced by changing the number of the sub-lines where a dot is recorded within a pixel. For this method, such a recording head is used that has heating elements with a length much less than the length of one pixel in the sub scan direction. Each time the recording head or the recording paper is moved by one sub-line amount in the sub scan direction, the heating elements are driven to record dots on the sub-lines designated by print data. Thereby, the size or the area of a dot in each pixel is changed in N steps to reproduce the gradation.

This area gradation method is effective for a printer which cannot control the density of a dot itself, such as a thermal wax transfer type printer which heats the back of an ink film and transfers melted or softened ink onto the recording paper.

Besides half-tone images, binary images such as characters and lines or an image containing a half-tone image in combination with characters are often required to be printed. Generally, a character is constituted of I×J pixels (I, J is an integer) and recorded in the form of a dot pattern wherein each dot is recorded in the whole area of the corresponding pixel.

However, in a conventional thermal printer using the above-described area gradation method, the same area gradation printing sequence is applied to the character printing as to the half-tone image printing. As a result, the characters may be chipped on the edge or may have an uneven density depending on the originals. Moreover, because the heating elements are activated at each sub-line position even for the character printing, the efficiency or the printing speed is lowered compared with a binary dot printer.

SUMMARY OF THE INVENTION

In view of the foregoing, a primary object of the present invention is to provide a thermal printing method by which characters are clearly printed, and half-tone images are faithfully reproduced.

Another object of the present invention is to provide a thermal printing method by which characters are recorded at a high speed compared with half-tone image printing speed.

A further object of the present invention is to provide a thermal printer for executing the printing method of the present invention.

To achieve the above and other objects, a method of the present invention discriminates inputted image data between half-tone image data and character image data, with reference to discrimination data. The half-tone image data and the character image data are stored separately and discriminately from each other. A character dot print mode is used to record characters according to two kinds of character dot print patterns: one kind is for recording a dot in the whole area of an associated pixel, and another is for recording no dot. On the other hand, half-tone images are recorded in the area gradation method using half-tone dot print patterns.

A thermal printer of the present invention is provided with a device for discriminating input data between half-tone image data and character image data, a memory for storing the half-tone image data, a character ROM for converting the character image data into character patterns, a memory for storing the character patterns, and a device for alternatively reading print data from one of the two memories in accordance with the image to be printed.

The thermal printer of the invention also has a counter for detecting position of a sub-line to be printed at present, and a dot print pattern look-up table consisting of a character print table and a half-tone print table which are addressed by the position of the sub-line detected by the counter. In accordance with the image to be printed, one of the character print table and the half-tone print table is selected to output comparison data which are different between the character printing and the half-tone printing. Comparators are provided for comparing the comparison data read from the dot print pattern lock-up table with the print data read from the memory, so as to generate a drive signal. In accordance with the drive signal, a head driver controls power conduction of heating elements.

According to the present invention, characters are recorded using the character print table, while half-tone images are recorded using the half-tone print table. Thereby, high quality character images having no chipped edge nor unevenness in density are recorded using the two kinds of character dot print patterns. On the other hand, half-tone images are recorded in the area gradation method using the half-tone dot print patterns.

A preferred embodiment of the present invention uses such heating elements that extend over a plurality of sub-lines in the sub scan direction, and energizes the heating elements at intervals corresponding to the plurality of sub-lines for the character printing. Therefore, it is possible to transport the recording paper at a high speed during the character printing.

BRIEF DESCRIPTION OF THE DRAWINGS

The aforesaid and other objects and advantages of the present invention will become more readily apparent in the following detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. In the accompanying drawings, like reference numerals designate like or corresponding parts throughout the several view. These accompanying drawings are given by way of illustration only, and thus are not limitative of the present invention. Wherein.

DETAILED DESCRIPTION OF THE PREFERRED EMBODIMENT

Figure 1:
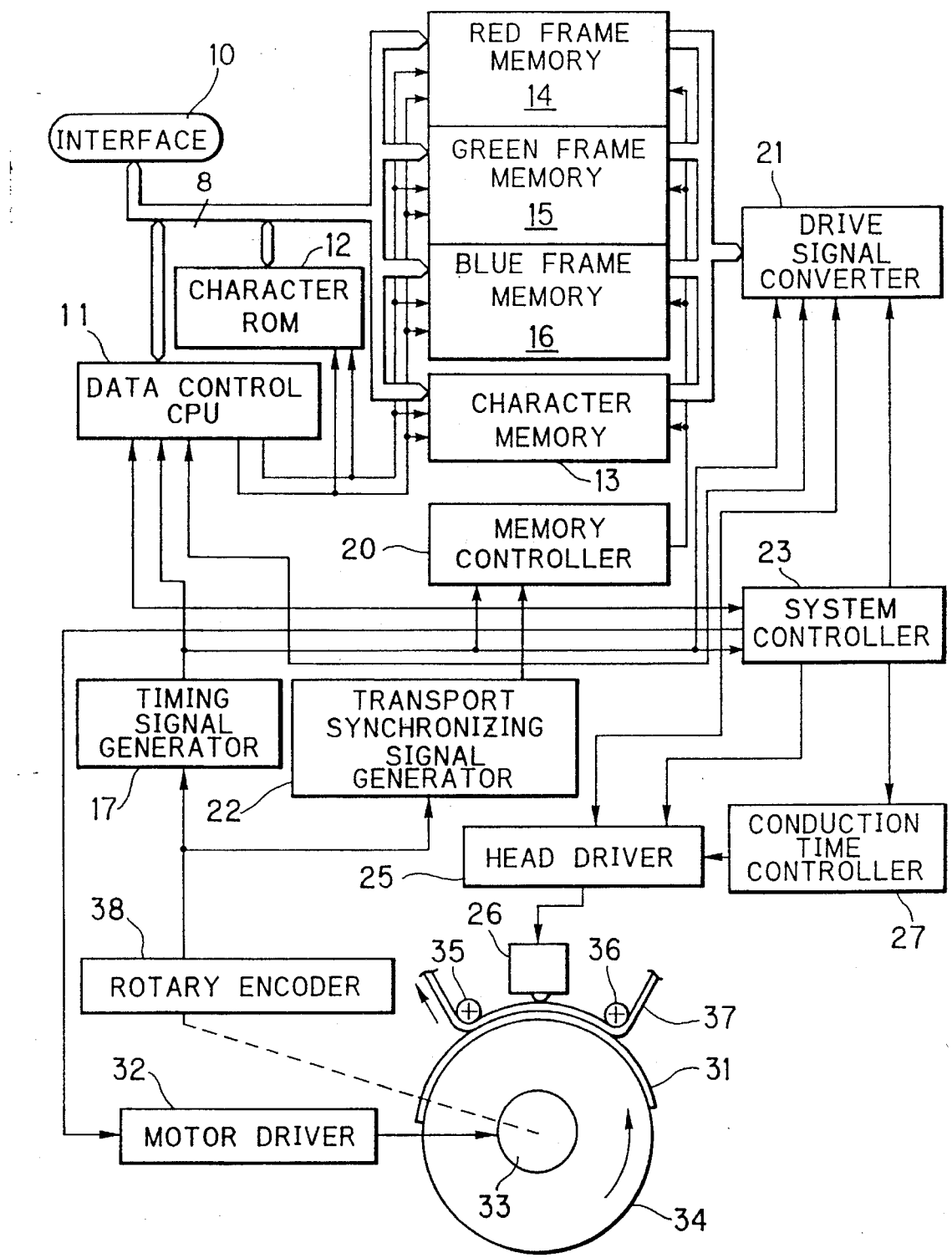
FIG. 1 is a schematic diagram showing a thermal wax transfer type printer according to an embodiment of the invention.

In a thermal printer shown in FIG. 1, an interface 10 is connected to an external image input apparatus such as a personal computer. A control word is first entered to a data control CPU (central processing unit) 11 through the interface 10, for determining whether an image signal to be inputted is a character image signal or a half-tone image signal, and thereafter the image signal is inputted.

If a character image signal is to be inputted, the data control CPU 11 reads a character pattern from a character ROM 12 by using the character image signal as address data. The character pattern is constituted of I×J pixels. Pixels having ink dots recorded thereon are designated by 8-bit character pixel data having a value "200" in decimal notation. Pixels having no ink dot are designated by another kind of 8-bit character pixel data having a value "0" in decimal notation. These character pixel data are written in a character frame memory 13 under the control of the data control CPU 11. The data control CPU 11 is timing-controlled by a clock signal from a timing signal generator 17.

If a half-tone image signal is to be inputted, the data control CPU 11 determines the color of each pixel of the three color separated full-color half-tone image, and writes the half tone image signal for each color in a corresponding one of three primary color frame memories 14, 15 and 16. In the half-tone image signal, 8-bit half-tone pixel data is assigned to each pixel. The half-tone pixel data has a value from "0" to "255" in decimal notation, which represents one of 266 tonal steps.

When printing the character image, a memory controller 20 reads the character pixel data one line after another from the character image memory 13, and sends the character pixel data to a drive signal converter 21, for use as print data.

When printing the full-color image, first the red frame memory 14 is selected to output half-tone pixel data of red pixels line by line to the drive signal converter 21, for use as print data. After recording a red frame in this way, the green frame memory 15 is selected to output green half-tone pixel data line by line to the drive signal converter 21. Finally, the blue frame memory 16 is selected to output blue half-tone pixel data. In this way, the full-color half-tone image is recorded in a three color frame sequential printing. Of course, the order of printing of the three color frames is changeable depending on the order of color ink.

When printing a half-tone image merged with characters, the half-tone image is recorded after the characters are recorded in the above-described manner. It is, of course, possible to record the half-tone image prior to the characters.

The drive signal converter 21 receives the clock signal and a clear signal from the timing signal generator 17, a transport synchronizing signal from a transport synchronizing signal generator 22, and a table switching signal from a system controller 23, so as to convert the print data read from the memories 13 to 16 line by line into drive signals, according to whether the data is character pixel data or half-tone pixel data. One line is constituted of $\underline{M}$ pixels aligned in a main scan direction, wherein M is an optional integer, so that M drive signals are produced for every M pixels of one line.

Figure 2:
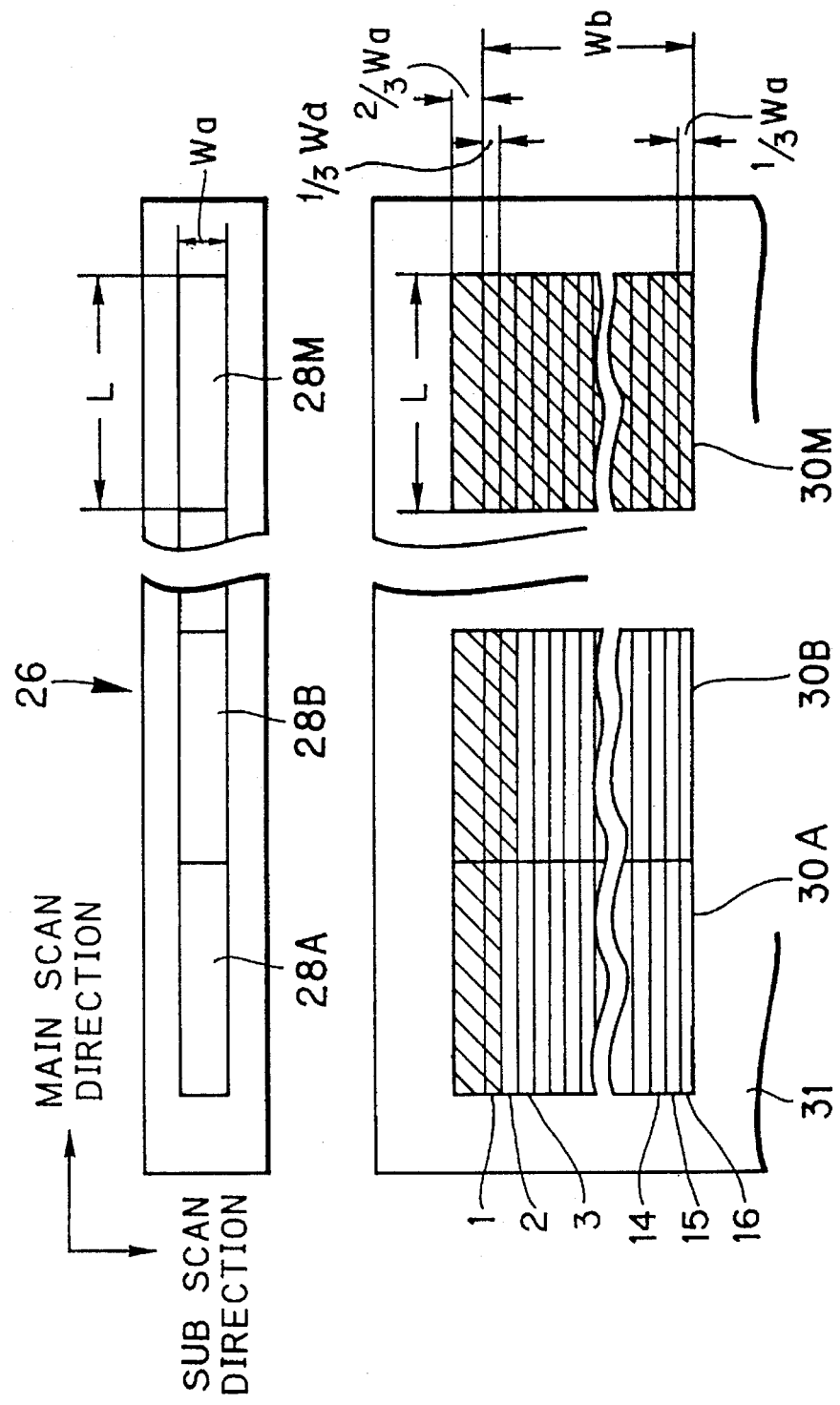
FIG. 2 is a diagram explaining a state of recording by heating elements.

The M drive signals are sent to a recording head 26 through a head driver 25. The head driver 25 receives a strobe signal from a conduction time controller 27 so as to control the power conduction time of heating elements 28A to 28M of the recording head 26 during the recording of dots. As shown in FIG. 2, the M heating elements 28A to 28M are arranged in the main scan direction. Each heating element has a rectangular shape with a length L in the main scan direction and a width Wa, that is, a length in a sub scan direction that is perpendicular to the main scan direction, wherein Wa is much less than L. In accordance with the M drive signals and the strobe signal, the heating elements 28A to 28M record dots in M rectangular pixels 30A to 30M aligned in the main scan direction on a recording paper 31.

Each pixel 30A to 30M has the same length L as the heating elements 28A to 28M in the main scan direction, and has a width Wb. That is, one line has the width Wb in the sub scan direction. In order to reproduce a gradation in an area gradation method, one pixel is constituted of n sub-lines (n is an integer) disposed in the sub scan direction, and the number of sub-lines to have ink dot recorded thereon is changed within the n sub-lines. In the present embodiment, one pixel is constituted of sixteen sub-lines, as is shown in FIG. 2. However, in order to reproduce a gradation comparable to that of photographs, it is desirable to divide one pixel into "32" to "128" sub-lines.

Each sub-line has a width one-third of the width Wa of the heating elements 28A to 28M. Because the size of the heating elements 28A to 28M corresponds to three sub-lines, each heating element recording the first sub-line of a pixel, is always opposed to the fifteenth and sixteenth sub-lines of the preceding pixel that is disposed before the presently recorded pixel in the sub scan direction. As a result, if no ink dot is recorded on the fifteenth and sixteenth sub-lines of the preceding pixel, ink is applied also on these sub-lines simultaneously with the recording of the first sub-line. If the fifteenth and sixteenth sub-lines of the preceding pixel have ink dots recorded thereon, no ink is applied on these sub-lines, as will be described in detail later.

This can be construed as that the first sub-line of each pixel has a width three times that of following sub-lines of the same pixel, and that the position of each pixel is staggered in the sub scan direction by an amount corresponding to two-third of the width Wa of the heating elements 28A to 28M. Such a pixel construction makes the grade of the tonal steps steeper in low density range.

However, this gives little change to the tone of the whole image.

It is instead possible to oppose the heating elements 28A to 28M to the first to third sub-lines after recording the sixteenth sub-line of the preceding pixels, by skipping three sub-lines, that is, by transporting the recording paper 31 by three sub-line amounts relative to the recording head 26, without energizing the heating elements 28A to 28M.

A motor driver 32 drives a pulse motor 33 under the control of the system controller 23, so as to rotate a platen drum 34, carrying the recording paper 31 on the periphery thereof, at a constant pitch for each motor drive pulse. For example, each time three motor drive pulses are applied, the recording paper 31 is transported by one sub-line amount. The motor driver 32 rotates the pulse motor 33 at a relatively low speed during the printing of half-tone images, because ink dot recording is effected each time the recording paper 31 is transported by one sub-line amount. On the other hand, the pulse motor 33 is rotated at a high speed during the printing of character images, because ink dot recording is effected one time for every three sub-lines, as will be described in detail later.

Rollers 35 and 36 depress an ink film 37 tightly on the periphery of the platen drum 34, and transport the ink film 37 synchronously with the platen drum 34 in the sub scan direction as shown by arrows in FIG. 1. As the back surface of the ink film 37 is heated by the recording head 19, ink is melted or softened to be transferred onto the recording paper 31. The ink film 37 is provided with black ink areas, yellow ink areas, magenta ink areas and cyan ink areas, each having the approximately same size as a recording area of the recording paper 31, and arranged sequentially and cyclically in the film transporting direction.

The platen drum 34 is connected to a rotary encoder 38 for generating an encoder pulse each time the platen drum 34 is rotated by one sub-line amount. The encoder pulses are sent to the timing signal generator 17 and the transport synchronizing signal generator 22. The timing signal generator 17 produces the clear signal on the basis of the encoder pulses, and sends the clear signal to the drive signal convertor 21. The transport synchronizing signal generator 22 outputs the transport synchronizing signal to the drive signal convertor 21 upon each receipt of the encoder pulse. The timing signal generator 17 also outputs a timing signal to the system controller 23, which sequentially controls relevant elements of the printer with reference to the timing signal.

Figure 3:
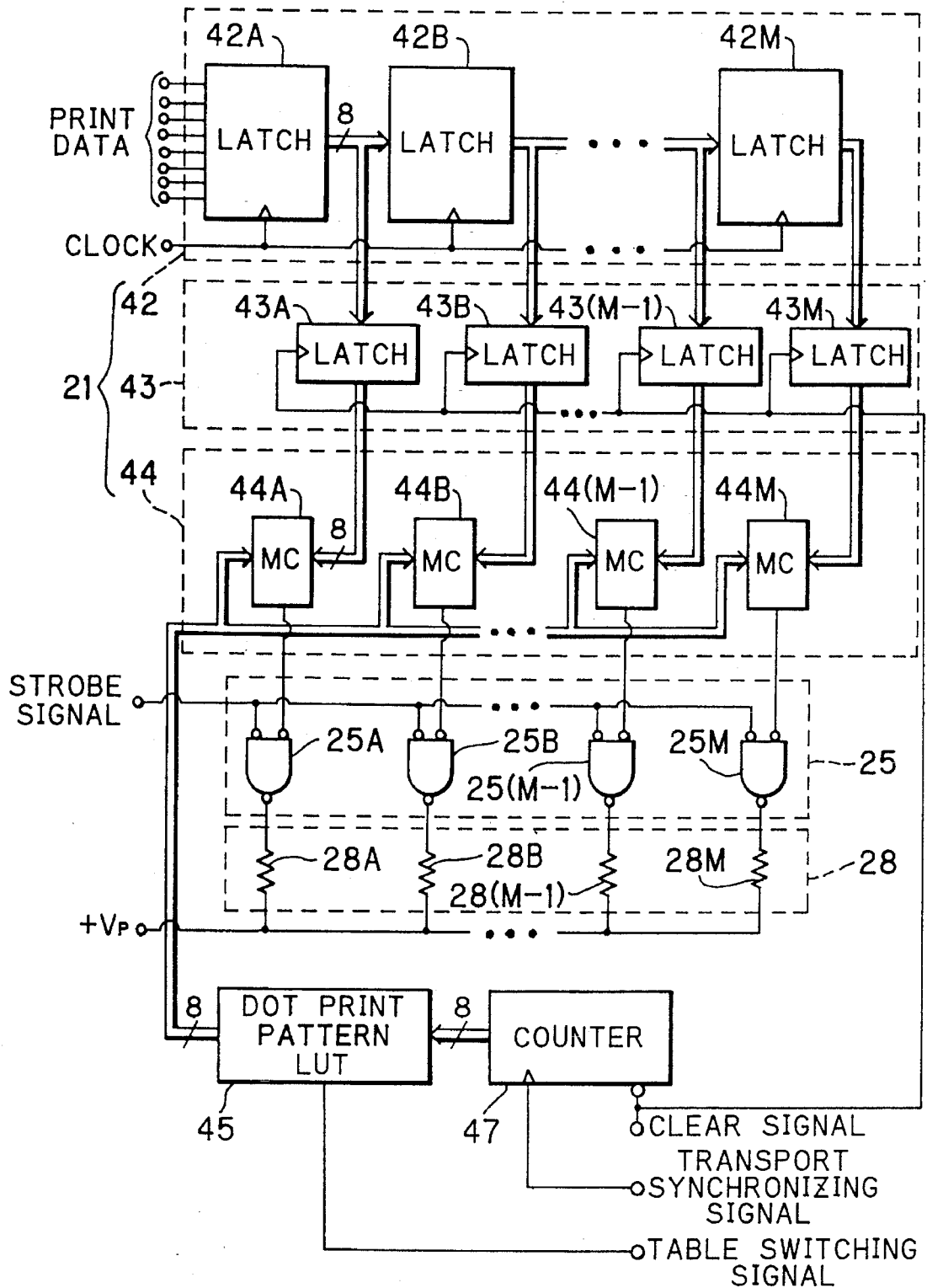
FIG. 3 is a block diagram showing a drive signal converter and a recording head driver according to an embodiment of the present invention.
Figure 4:
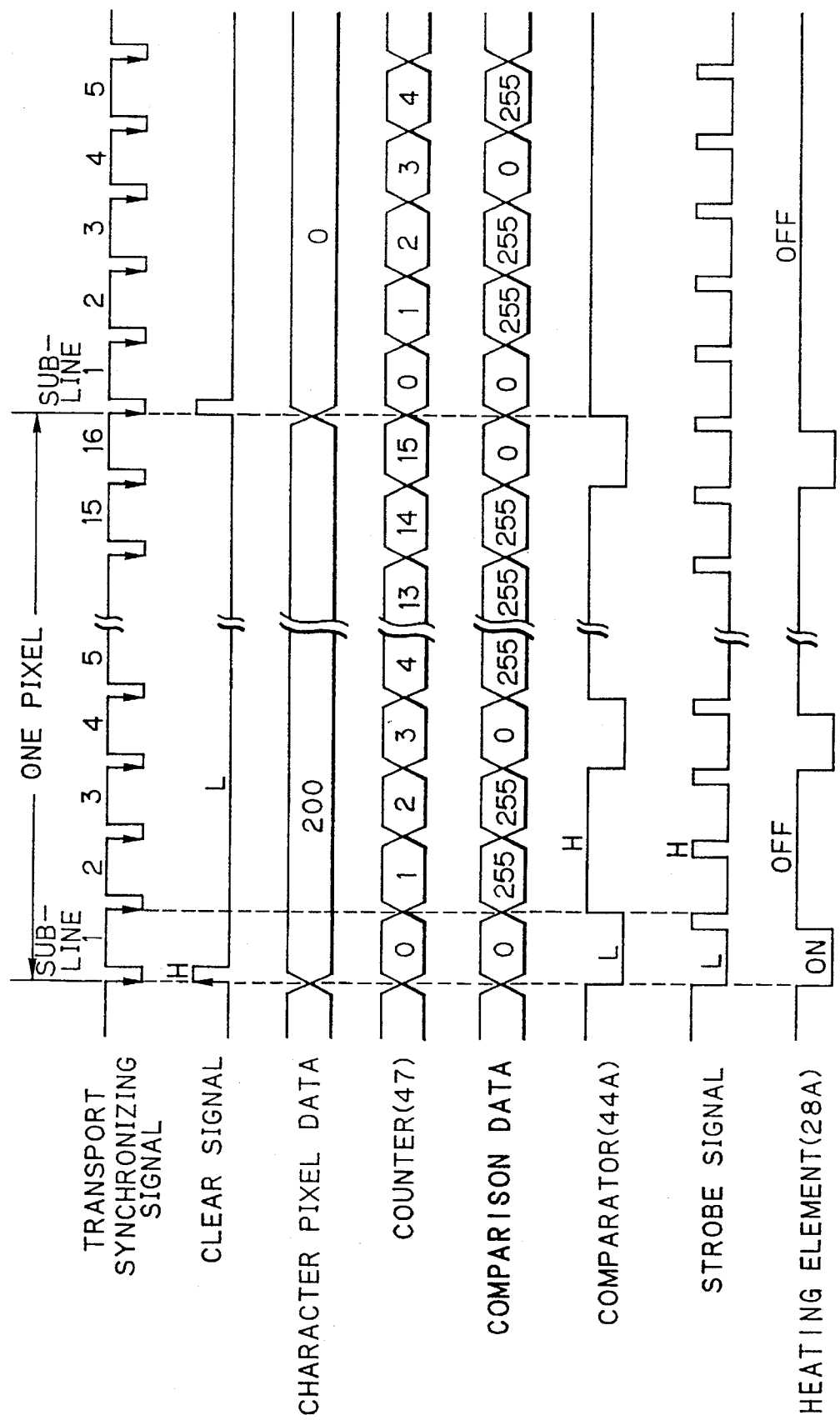
FIG. 4 is a timing chart showing the operation of the circuit shown in FIG. 3 in a case of character printing.
Figure 5:
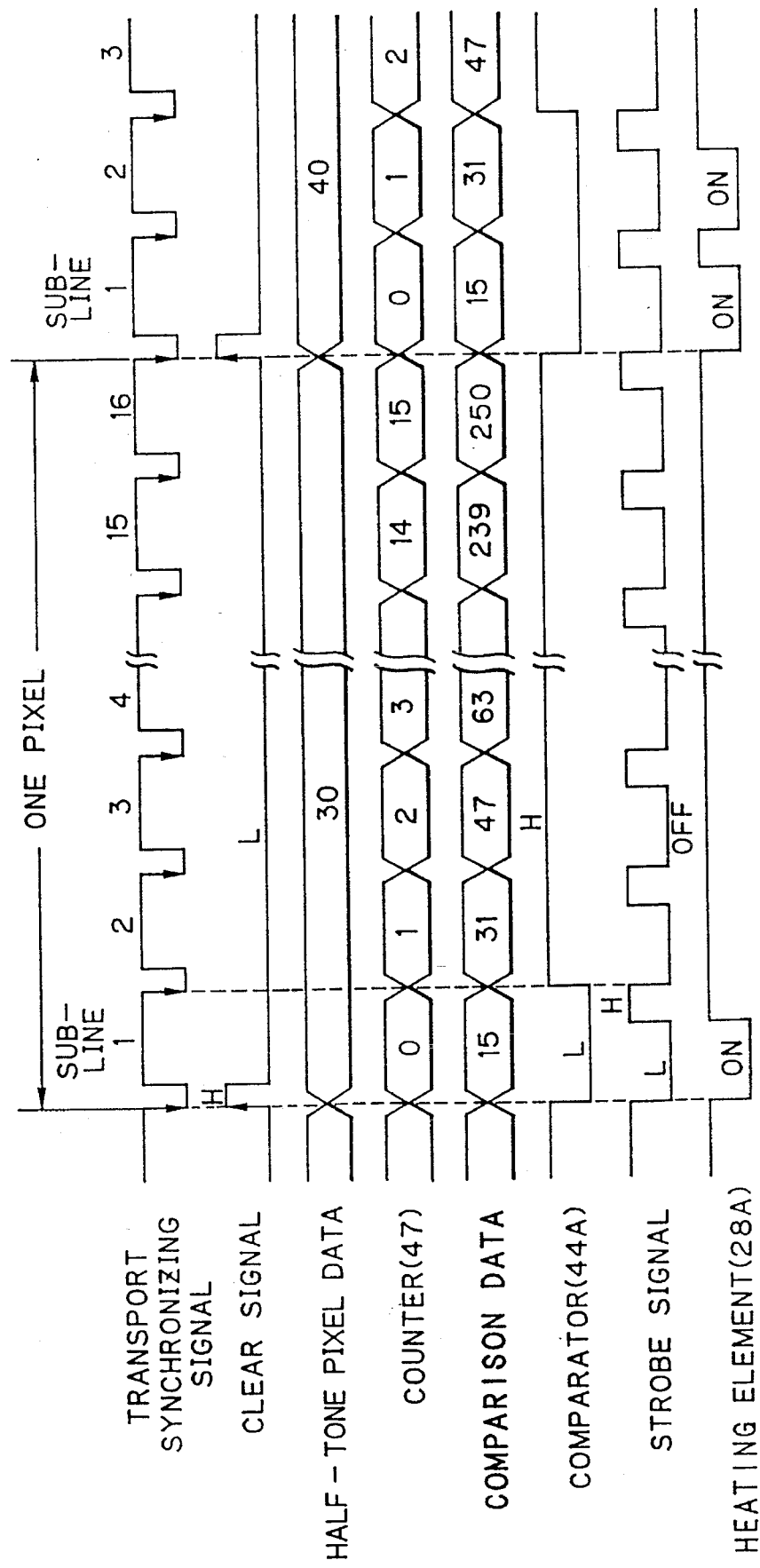
FIG. 5 is a timing chart similar to FIG. 4, but showing a case of half-tone image printing.

FIG. 3 shows the circuitry of the drive signal converter 21 and the recording head driver 25, and the timing charts of this circuitry are shown in FIGS. 4 and 5, wherein FIG. 4 illustrates an example of character printing operation, and FIG. 5 illustrates an example of half-tone image printing operation.

As shown in FIG. 3, the drive signal converter 21 includes a shift register 42, a latch array 43 and a comparator computer array 44. The shift register 42 is constructed of serially connected M 8-bit latches 42A to 42M, each having eight input terminals and eight output terminals for parallel input/output of 8-bit print data. M print data of one line of the main scan direction are sequentially inputted to the shift register 42, and shifted synchronously with the clock signal from the timing signal generator 17.

The shift register 42 is connected to the latch array 43 constructed of M 8-bit latches 43A to 43M for latching respective 8-bit print data. The M print data are thus converted into parallel M print data in the shift register 42, and latched by the latch array 43 in response to the clear signal from the timing signal generator 17. Specifically, the parallel M print data are latched at the timing of a rising edge of the clear signal which takes a high level "H" at every sixteenth falling edge of the transport synchronizing signal.

The latch array 43 is connected to the comparator array 44 constructed of M 8-bit magnitude comparators 44A to 44M each outputting a drive signal of a low level "L" when the print data is larger than or equal to comparison data read from a dot print pattern LUT (look-up table) 45. On the other hand, a counter 47 counts each transport synchronizing signal which is generated every time the recording paper 31 is moved by one sub-line amount, to thereby identify the position of a present sub-line with the pixel. The counter 47 is reset to an initial value upon receipt of the clear signal, that is, when sixteen transport synchronizing signals have been counted. The counter 47 outputs the count value in the form of a 8-bit address signal for reading the dot print pattern LUT 45. The dot print pattern LUT 45 includes a character print table shown in Table 1 and a half-tone print table shown in Table 2:

TABLE 1

| ADDRESS | COMPARISON |
| --- | --- |
| 0 | 0 |
| 1 | 255 |
| 2 | 255 |
| 3 | 0 |
| 4 | 255 |
| 5 | 255 |
| 6 | 0 |
| 7 | 255 |
| 8 | 255 |
| 9 | 0 |
| 10 | 255 |
| 11 | 255 |
| 12 | 0 |
| 13 | 255 |
| 14 | 255 |
| 15 | 0 |

TABLE 2

| ADDRESS | COMPARISON |
| --- | --- |
| 0 | 15 |
| 1 | 31 |
| 2 | 47 |
| 3 | 63 |
| 4 | 79 |
| 5 | 95 |
| 6 | 111 |
| 7 | 127 |
| 8 | 143 |
| 9 | 159 |
| 10 | 175 |
| 11 | 191 |
| 12 | 207 |
| 13 | 223 |
| 14 | 239 |
| 15 | 250 |

The character print table stores a sequence of comparison data having a value "0" or "255" in decimal notation in such a manner that the character pixel data "200" of the pixel having ink dots recorded thereon is converted into a dot print pattern for energizing the heating element at every three sub-lines. The half-tone print table stores comparison data as shown in Table 2, for converting the half-tone pixel data of one pixel into one of sixteen dot print patterns such that the 256 tonal steps of the half-tone pixel data is compressed into sixteen tonal steps. The system controller 23 selects one of the character print table and the half-tone print table in accordance with the content of the image to be printed. The comparison data is read from the selected print pattern table using the address signal from the counter 47, and sent to the comparator array 44.

Output terminals of the comparator array 44 are connected to the head driver 25, which is constructed of M NAND gates 25A to 25M such that an input of each NAND gate is connected to the output of one of the M comparators 44A to 44M, and the other input of each NAND gate receives the strobe signal from the conduction time controller 27. When the strobe signal of a low level "L" is inputted while the drive signal of a low level "L" is supplied from the associated comparator, the output of the NAND gate takes a low level "L". The strobe signal is used to confine the power conduction time of the heating elements 28A to 28M, and generated in synchronism with the transport synchronizing signal, for example, at each falling edge of the transport synchronizing signal. Because sixteen sub-lines constitute one pixel in the present embodiment, the strobe signal is generated 16 times during the recording of one pixel.

The head driver 25 is connected to a heating element array 28 constructed of the M heating elements 28A to 28M aligned in the main scan direction. Each heating element 28A to 28M outputs a low level "L" signal to heat the back of the ink film 37 and transfer ink onto the recording paper 31.

Referring to FIGS. 6–10, the operation of the above-described thermal printer will be described with respect to the printing of a merge image containing a half-tone image merged with characters.

Figure 6:
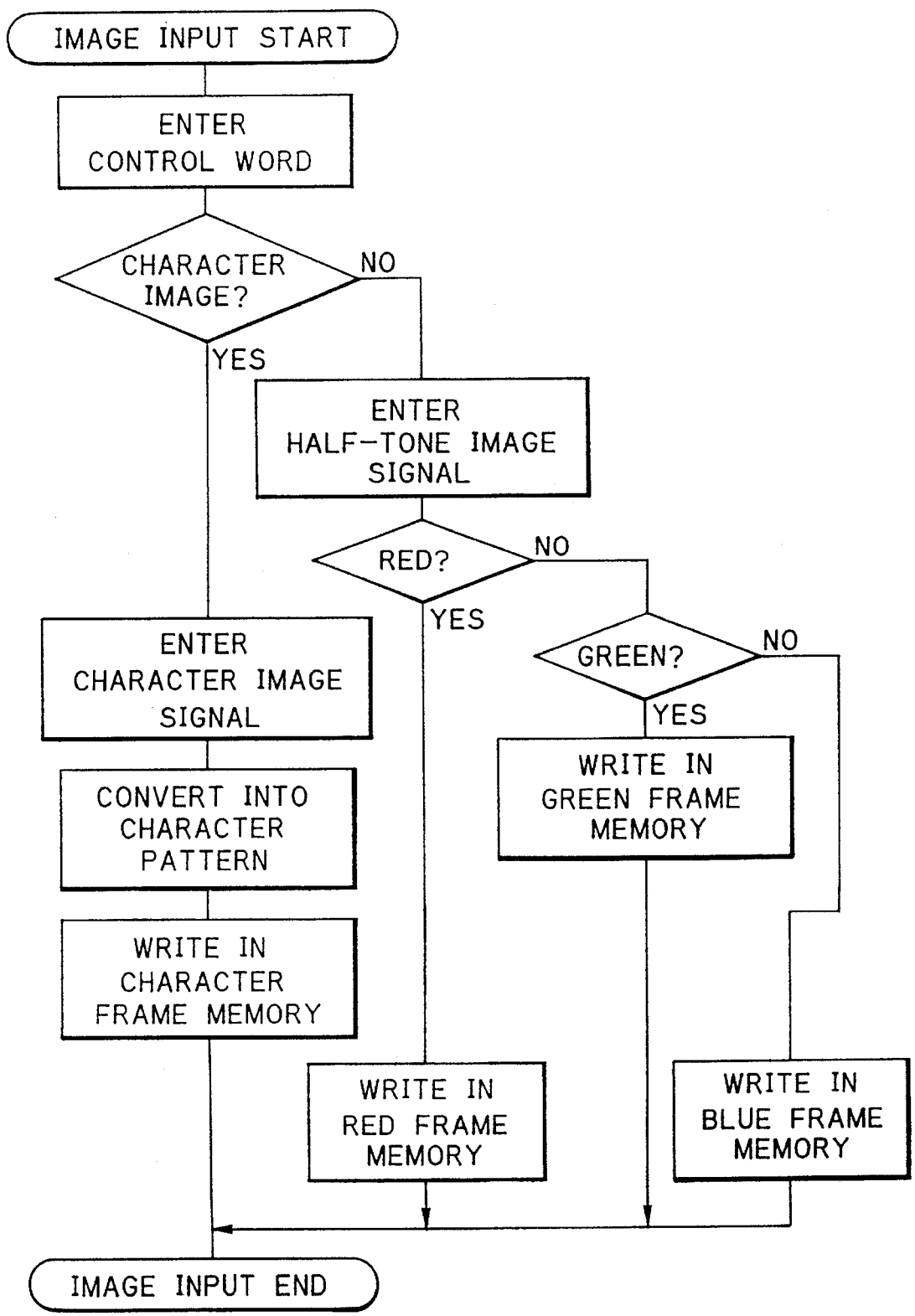
FIG. 6 is a flow chart showing a sequence of data input.

As shown in FIG. 6, a control word is first entered to the data control CPU 11 through the interface 10. The data control CPU 11 decodes the control word to determine whether an image signal to be inputted represents a character image or a half-tone image.

If it is determined that the image signal represent the character image, each character represented by the character image signal is converted into a character pattern constituted of I×J pixels, with reference to the character ROM 12. In the character pattern, character pixel data "200" are allocated to those pixels having ink dots recorded thereon, and character pixel data "0" are allocated to those pixels having no ink dot. The data control CPU 11 writes these character pixel data in the character frame memory 13. If, on the other hand, a half-tone image signal is to be inputted, the data control CPU 11 discriminates the color of each pixel of the half-tone image, and writes the three primary color separation frames of the half-tone image in the respective three primary color frame memories 14, 15 and 16.

Figure 7:
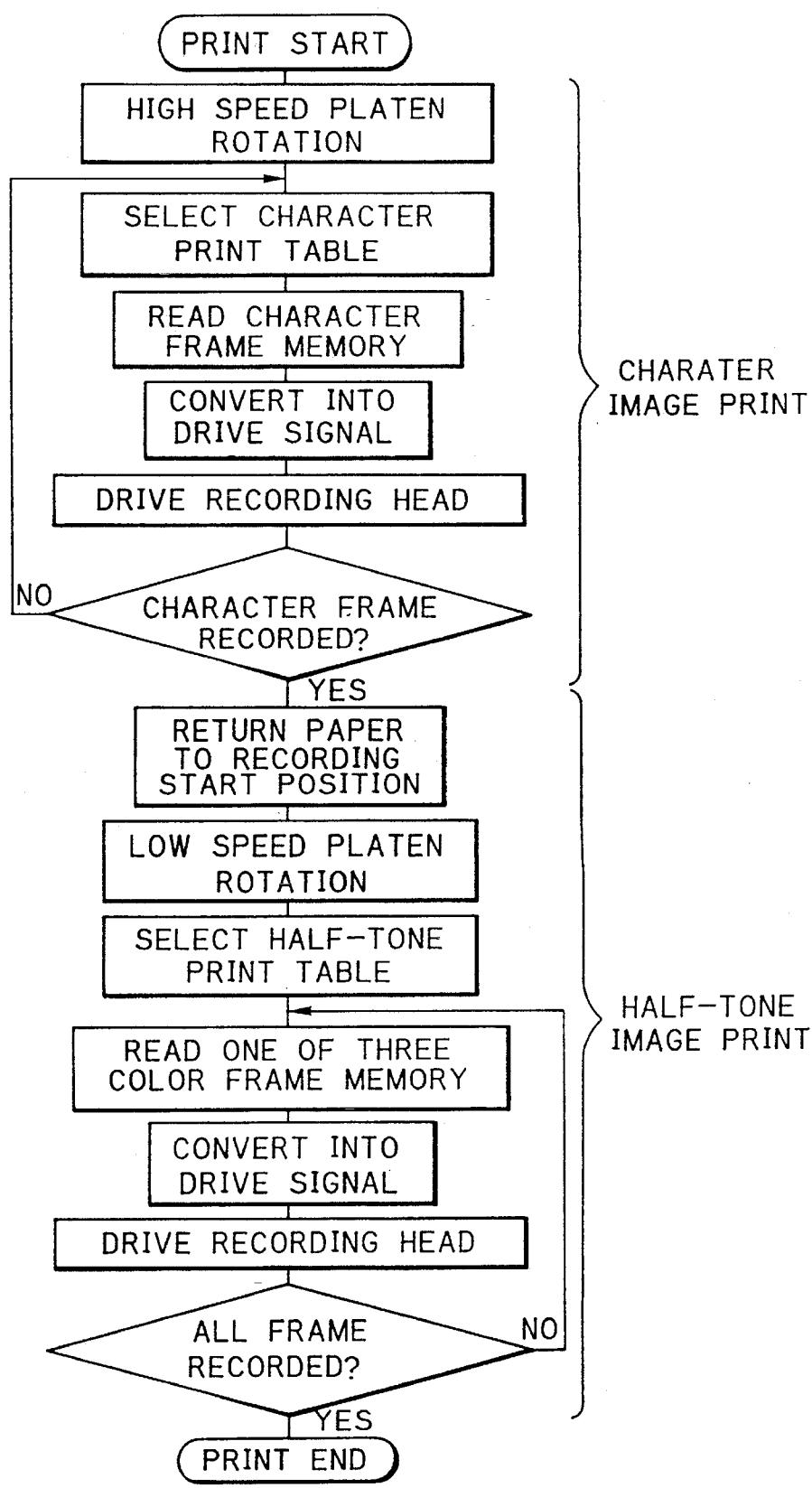
FIG. 7 is a flow chart showing a sequence of printing an image containing characters and a half-tone image.

After inputting the image signal, a command for merge printing is manually entered, for example, through a keyboard (not shown). In the merge printing, first the character image is recorded and then the full-color half-tone image is recorded by three color frame sequential printing, as is illustrated in FIG. 7. The system controller 23 first sends the table switching signal to the dot print pattern LUT 45 to select the character print table shown in Table 1. Next, the system controller 23 actuates the motor driver 32 to drive the pulse motor 33 to rotate stepwise at the high speed. Thereby, the platen drum 34 carrying the recording paper 31 is rotated in the sub scan direction. Simultaneously with positioning the recording paper in a recording start position wherein a leading end of the recording area of the recording paper 31 is placed in front of the recording head 26, the ink film 37 is transported to position a leading end of the black ink area in front of the recording head 26.

Rotation of the platen drum 34 is detected by the rotary encoder 38 to send the encoder pulse to the timing signal generator 17 and the transport synchronizing signal generator 22. Based on the encoder pulse, the timing signal generator 17 outputs the timing signal to the system controller 23 so as to sequentially control circuit elements of the thermal printer while giving synchronous operations between the elements. The timing signal generator also outputs the clear signal to the drive signal converter 21. Also the transport synchronizing signal generator 22, using the encoder pulse as reference, outputs one transport synchronizing signal each time the platen drum 34 rotates by one sub-line amount, and sends the transport synchronizing signal to the head driver 21.

Immediately before the recording paper 31 reaches the recording start position, the system controller 23 sends a reading signal to the memory controller 20. The memory controller 20 sets the character frame memory 13 in a read mode, and then reads M character pixel data of one line from the character frame memory 13. The M character pixel data are sequentially sent to the shift register 42 of the head driver 21. The shift register 42 shifts and latches the M character data in response to the clock signal from the timing signal generator 17.

The M character pixel data latched in the shift register 42 are latched into the latch array 43 in response to the clear signal which is generated from the timing signal generator 17 when the leading end of the recording area is opposed to the heating element array 28. The clear signal also resets the counter 47 to the initial count value "0" in decimal notation, whereupon the dot print pattern LUT 43 outputs comparison data having a value "0" in decimal notation, as is shown in Table 1.

According to the example shown in FIG. 4, character pixel data of the first pixel 30A of the first line has a value "200" in decimal notation, so that the magnitude comparator 44A outputs a signal of "L". In this condition, when the strobe signal of "L" is outputted from the conduction time controller 27, the output of the NAND gate 25A takes a low level "L". Since the heating element 28A is supplied with a voltage Vp at its one end, current flows through the heating element 28A toward the NAND gate 25A. This means that a current pulse having a constant width is applied to the heating element 28A, because the time period while this current flows is confined by the strobe signal. The heating element 28A is heated by the pulse current to heat the back of the ink film 37, thereby transferring black ink onto the recording paper 31. In this way, a black dot is recorded on the first sub-line as shown in FIG. 2.

After the recording of the first sub-line, the platen drum 34 rotates by one sub-line amount, so that the second sub-line is placed in front of the heating element array 28, and the ink film 37 is also transported by one sub-line amount. At this time, the count of the counter 47 is incremented by the transport synchronizing signal to take a value "1". In response to the count value "1", the dot print pattern LUT 45 outputs comparison data having a value "255". As the character pixel data "200" is smaller than the comparison data "255", the magnitude comparator 44A outputs a signal of "H". As a result, the output of the NAND gate 25A takes a high lever "H", so that the heating element 28A is not powered even through the second strobe signal is applied to the NAND gate 25A. Therefore, ink transfer is not effected in this condition.

In the same way as for the second sub-line, since comparison data for the third sub-line is "255", the heating element 28A is not powered when the third sub-line is first opposed to the heating element 28A.

In case of the fourth sub-line, the counter 47 has a value "3", and the dot print pattern LUT 45 outputs comparison data "0". Therefore, the magnitude comparator 44A outputs a signal of "L", thereby applying a current pulse of the constant width to the heating element 28A in response to the strobe pulse. At that time, since the heating element 28A faces to the second to fourth sub-lines, black ink is simultaneously transferred onto the second to fourth sub-lines. In the same manner as above, the heating element 28A is powered for every three sub-lines, that is, six times, so as to record black ink on the entire area of the pixel 30A. As to the other pixels 30B to 30M of the first line, ink transfer operation is performed in the same way as in the first pixel 30A, so long as the character pixel data "200" is allocated thereto.

In the example of FIG. 4, character pixel data "0" is allocated to the first pixel of the second line. In this case, the output of the magnitude comparator 44A is maintained at a high level "H" because the character pixel data "0" is not larger than the comparison data "0" and "255". Therefore, the heating element 28A is not powered, and all of the sixteen sub-lines of the first pixel of the second line have no black ink dot thereon.

Figure 8A:
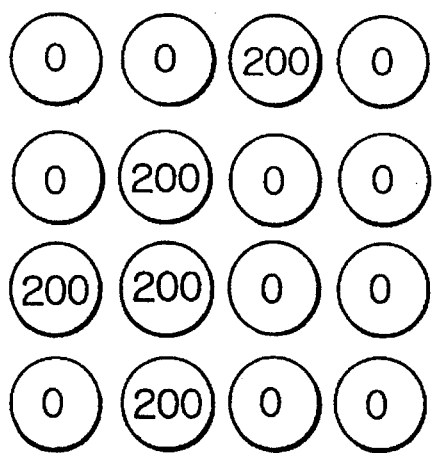
FIGS. 8A and 8B are explanatory views showing a relationship between character pixel data and ink dots recorded correspondingly.
Figure 8B:
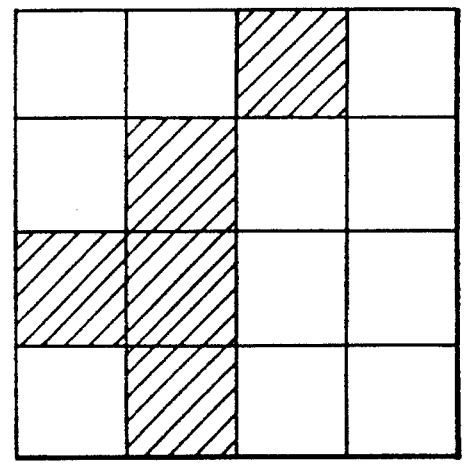

In this way, those pixels allocated with the character pixel data "200" have black ink dots recorded on the entire area thereof, while those pixels allocated with the character pixel data "0" have no black ink dot, as is exemplified in FIGS. 8A and 8B, wherein the pixel data are arranged in a matrix corresponding to a matrix of pixels, and the hatched or shadowed areas represent the ink dots in the pixels. As a result, a character is recorded as character pixel data of I×J pixels arranged in a matrix.

Figure 10:
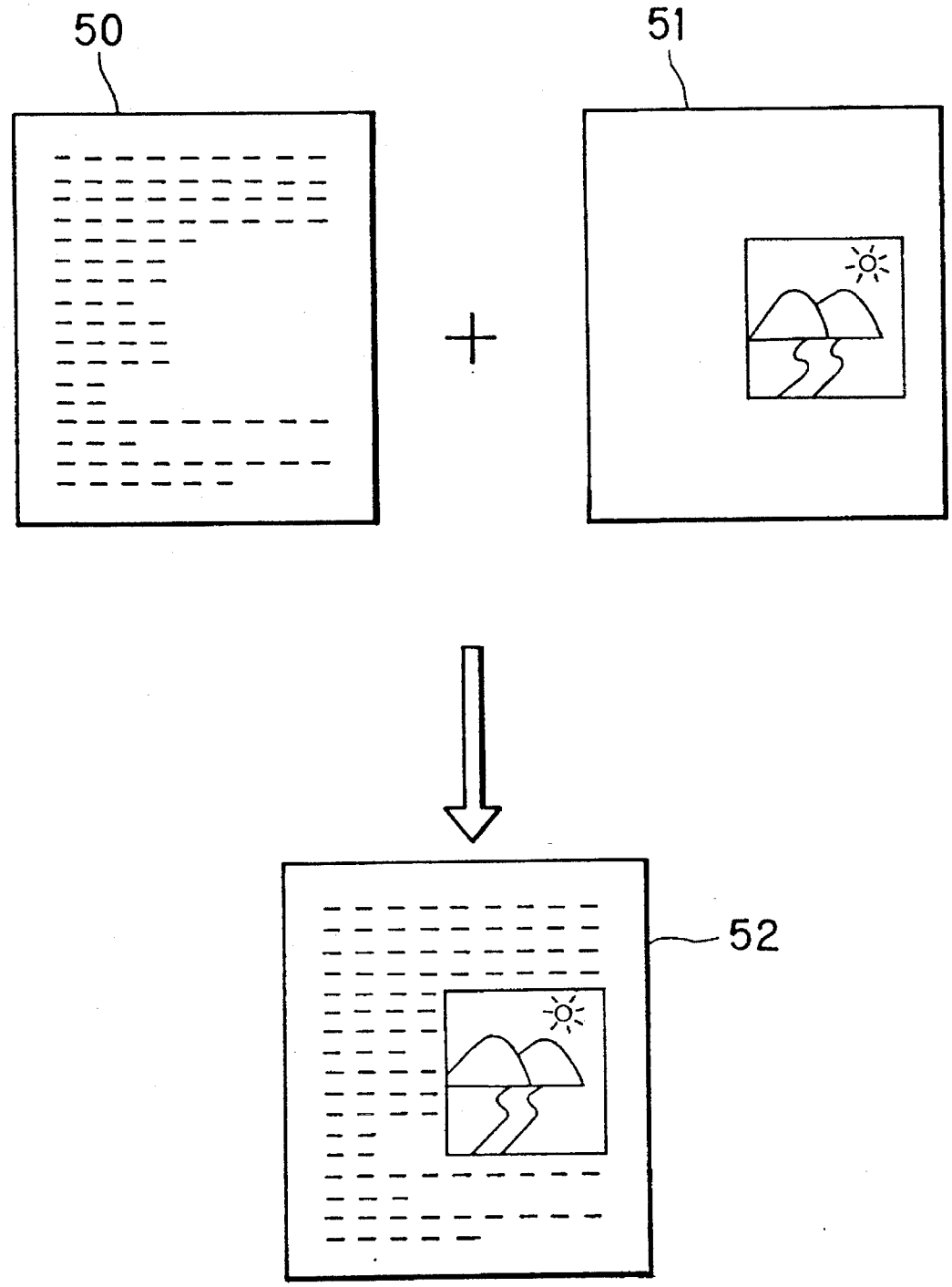
FIG. 10 is an explanatory view showing a composition of a merge image containing a half-tone image merged with characters.

When the platen drum 34 has been rotated to transport the recording paper 31 into a recording end position where a trailing end of the recording area of the recording paper 31 has passed by the recording head 26, for example a character frame 50 shown in FIG. 10 has been recorded on the recording paper 31. It is, of course, possible to record the character frame in a color other than black by using a corresponding color ink area.

After printing the character frame, the full-color half-tone image starts to be printed in the three color frame sequential method. The system controller 23 sends a table switching signal to the dot print pattern LUT 45 so as to select the half-tone print table shown in Table 2. Thereafter, the system controller 23 actuates the motor driver 32 to rotate the pulse motor 33 and transport the recording paper 31 and the ink film 37 at the low speed.

Immediately before the recording paper 31 reaches the recording start position, the system controller 23 sends a red frame reading signal to the memory controller 20. Then, the memory controller 20 sequentially reads M red pixel data of one line from the red frame memory 14. The M red pixel data are latched in the latch array 43 through the shift register 42. Simultaneously with placing the recording paper 31 in the recording start position, the leading end of the yellow ink area of the ink film 37 is positioned in front of the heating element array 28.

Because the counter 47 is reset to "0" by the clear signal, the dot print pattern LUT 43 outputs comparison data having a value "15" in decimal notation, as is shown in Table 2. According to the example shown in FIG. 5, red pixel data of the first pixel 30A of the first line has a value "30" in decimal notation, so that the magnitude comparator 44A outputs a signal of "L". In this condition, when the strobe signal of "L" is outputted from the conduction time controller 27, a current pulse having the constant width is applied to the heating element 28A. Thereby, the heating element 28A is heated to transfer yellow ink onto the first sub-line of the pixel 30A. After the recording of the first sub-line, the platen drum 34 rotates by one sub-line amount, so that the second sub-line is opposed to the heating element array 28, and the ink film 37 is also transported by one sub-line amount. At this time, the count of the counter 47 is incremented by the transport synchronizing signal to take a value "1", so that the dot print pattern LUT 45 outputs comparison data having a value "31". As the red pixel data "30" is smaller than the comparison data "31", the magnitude comparator 44A outputs a signal of "H", so that the heating element 28A is not powered even though the second strobe signal is applied. Because the value of comparison data of the half-tone print table increases with the address number or the count value of the counter 47, a yellow dot is recorded merely on the first sub-line in the pixel 30A allocated with the red pixel data "30".

Since the red pixel data for the first pixel of the second line has a value "40" in the example of FIG. 5, the heating element 28A is heated to record an ink dot on the first sub-line of the second line in the same manner as for the first line. Simultaneously, the ink dot is recorded on the fifteenth and sixteenth sub-lines of the first pixel 30A of the first line, because the heating element 28A faces these sub-lines of the first line during the recording of the first sub-line of the second line.

When the platen drum 34 is rotated to place the second sub-line of the second line in front of the heating element array 28, the dot print pattern LUT 45 outputs comparison data "31". Because the comparison data "31" is less than the red pixel data "40", the output of the magnitude comparator 44A is maintained at the high level "H". When the strobe signal is applied in this condition, the heating element 28A is powered to record a yellow dot on the second sub-line of the second line.

During the recording of the second sub-line of the second line, the heating element 28A also heats the portion of the ink film 37 that overlies on the first sub-line of the second line and the sixteenth sub-line of the first line. However, as the ink film 37 is transported by the same amount in the same direction as the recording paper 31, yellow ink of that portion has been already transferred onto the recording paper 31 during the recording of the first sub-line of the second line. Therefore, yellow ink is not again applied on the first sub-line of the second line and the sixteenth sub-line of the first line.

For the printing on the third sub-line, comparison data having a value "47" is allocated. Because the allocated comparison data "47" is larger than the red pixel data "40", the output of the magnitude comparator 44A takes the high level "L". In this condition, the heating element 28A is not powered even when the strobe signal is inputted. Therefore, no yellow ink dot is recorded on the third and following sub-lines in the first pixel of the second line, as the pixel data "40" is allocated to this pixel.

Figure 9A:
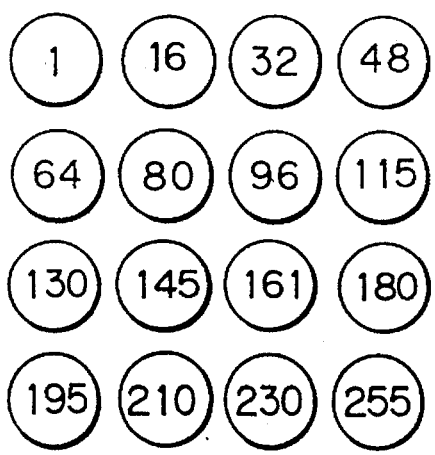
FIGS. 9A and 9B are explanatory views showing a relationship between half-tone pixel data and ink dots recorded correspondingly.
Figure 9B:
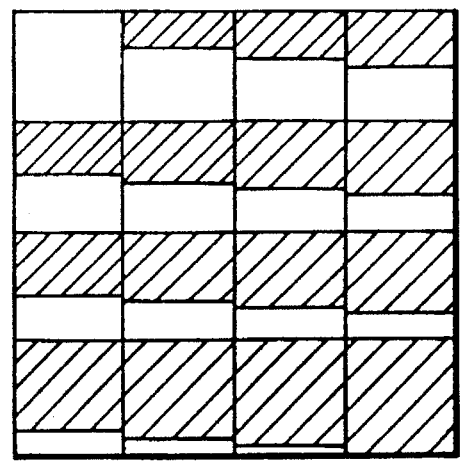

FIGS. 9A and 9B illustrate the relationship between the value of the half-tone pixel data and the size of the ink dot within a pixel, in the same manner as FIGS. 8A and 8B.

After recording the red frame, green frame starts to be recorded when the recording paper 31 is transported again into the recording start position. In the green frame recording, the memory controller 20 reads green half-tone pixel data line by line from the green frame memory 15. In accordance with the green pixel data, the heating element array 28 is energized to heat the magenta ink area of the ink film 37 and record magenta dots of various sizes line by line on the recording paper 31. After recording the green frame, blue half-tone pixel data are read from the blue frame memory 16 to record cyan dots on the recording paper 31 by using the cyan ink area.

In this way, for example a full-color half-tone image 51 is recorded on the recording paper 31. Because the character image 50 is already recorded on the same recording paper 31, a printed merge image 52 containing characters merged with the half-tone image is obtained.

The present invention has been described in detail with reference to a preferred embodiment shown in the drawings, the present invention should not be limited to the embodiment. For example, it is possible to use heating elements having a width or a length in the sub scan direction that is equal to the width of the sub-line. In this embodiment, however, it is necessary to energize the heating element for each sub-line. Therefore, characters are recorded at the same speed as for half-tone images. Although one pulse current is applied to record one sub-line in the illustrative embodiment, it is possible to generate a plurality of strobe signals for each sub-line so as to apply more than one pulse current to the heating elements during the recording of one sub-line.

Furthermore, although a line printer incorporating linear motion of a recording paper and an ink film relative to a recording head has been described, the present invention is also applicable to a serial printer incorporating two-dimensional relative motion. Such a serial printer uses a movable recording head having heating elements aligned in the direction of feeding a recording sheet. Therefore, with a serial printer, the direction of feeding a recording sheet and the direction of disposing heating elements are in the above-described main scan direction, and the direction of moving a recording head is in the sub scan direction.

The present invention is also applicable to other printers for printing a half-tone image by an area gradation method, such as sublimation transfer type thermal printers, direct thermal printers using thermosensitive recording medium and so forth. Instead of the pulse motor, a DC motor may be alternatively used, and may cause the platen drum to rotate continuously.

Various changes and modifications to the illustrative embodiments described above will be apparent to those skilled in the art. These changes and modifications can be made without departing from the spirit and the scope of the invention and without diminishing its attendant advantages. It is therefore intended that such changes and modifications as would be obvious to one skilled in the art are to be included within the scope of the following claims.

What is claimed is:

1. A thermal printing method using a plurality of heating elements disposed in a first direction, said heating elements being moved relative to a recording medium in a second direction perpendicular to said first direction so as to simultaneously record dots in a plurality of pixels disposed in said first direction on said recording medium, each of said pixels being constituted by a plurality of sub-lines and a tonal gradation being reproduced by changing the number of said sub-lines having a dot recorded thereon within each of said pixels, said thermal printing method comprising the steps of:

discriminating based on discrimination data whether image data inputted thereto is half-tone image data or character image data;

storing said half-tone image data in a first memory;

storing said character image data in a second memory;

printing a half-tone image in accordance with said half-tone image data in a first dot print mode; and printing a character image in accordance with said character image data in a second dot print mode which differs from said first dot print mode.

2. A thermal printing method as recited in claim 1, wherein each of said heating elements has a first length in said first direction and a second length in said second direction, said second length being much less than said first length.

3. A thermal printing method as recited in claim 2, wherein said first dot print mode comprises a plurality of half-tone dot print patterns corresponding to a number of tonal steps of said tonal gradation, so as to change the size of dots in accordance with said half-tone image data, and said second dot print mode comprises a first character dot print pattern for recording a dot in the whole area of a first one of said pixels and a second character dot print pattern for recording no dot in a second one of said pixels.

4. A thermal printing method as recited in claim 2, wherein said first dot print mode energizes said heating elements in accordance with said half-tone image data of each pixel to be printed each time said heating elements are moved relative to said recording medium by an amount corresponding to one sub-line in said second direction.

5. A thermal printing method as recited in claim 4, wherein said first length of said heating elements is N times longer than the length of said sub-line in said second direction, N being an integer, and said second dot print mode is adapted to energize said heating elements in accordance with said character image data of each pixel to be printed, each time said heating elements are moved relative to said recording medium by an amount corresponding to N sub-lines in said second direction.

6. A thermal printing method as recited in claim 5, wherein said N is "3".

7. A thermal printing method as recited in claim 5, wherein said character image storing step comprises the steps of:

converting a character represented by said character image data into character pixel data for allocating one of said first and second character dot print patterns to each of I×J pixels arranged in a matrix which constitute said one character; and storing said character pixel data in said second memory.

8. A thermal printing method as recited in claim 7, wherein said half-tone image is a full-color image, and said half-tone image storing step comprises the steps of:

discriminating a color of said half-tone image data; and storing said half-tone image data for each color in three color frame memories which constitute said first memory.

9. A thermal printing method as recited in claim 8, wherein said full-color image is printed according to three color frame sequential printing.

10. A thermal printer having a plurality of heating elements disposed in a first direction, said heating elements being moved relative to a recording medium in a second direction perpendicular to said first direction so as to simultaneously record dots in a plurality of pixels on said recording medium, each of said pixels being constituted of a plurality of sub-lines and a tonal gradation being reproduced by changing the number of said sub-lines having a dot recorded thereon within each of said pixel, said thermal printer comprising:

discrimination means for discriminating, based on discrimination data, whether image data inputted thereto is one of half-tone image data and character image data;

a first memory for storing said half-tone image data;

a second memory for storing said character image data;

reading means for selecting one of said first memory and said second memory depending on whether an image to be printed is a half-tone image or a character image, and reading said selected one of said first and second memories;

a counter for detecting a position of one of said sub-lines on which said heating elements can record dots at present;

a dot print pattern look-up table including a half-tone print table for outputting a first sequence of comparison data and a character print table for outputting a second sequence of comparison data which is different from said first sequence of comparison data, one of said half-tone print table and said character print table being selected in accordance with said image to be printed, and addressed by the sub-line position detected by said counter;

a comparator for comparing one of said first and said second sequence of comparison data respectively with one of said half-tone image data and said character image data read from said selected one of said first and second memories, so as to generate a drive signal; and a driver for controlling power conduction through said heating elements in accordance with said drive signal, so as to record dots in said pixels.

11. A thermal printer as recited in claim 10, wherein each of said heating elements has a first length in said first direction and a second length in said second direction, said second length being much less than said first length.

12. A thermal printer as recited in claim 11, further comprising a character ROM for converting a character represented by said character image data into character pixel data for allocating one of said first and second character dot print patterns to each of I×J pixels arranged in a matrix which constitute said one character, wherein said character pixel data are stored in said second memory.

13. A thermal printer as recited in claim 12, wherein said first length of said heating elements is N times the length of said sub-line in said second direction, N being an integer, and said second sequence of comparison data from said character print table are used to energize said heating elements in accordance with said character pixel data each time said heating elements are moved relative to said recording medium by an amount corresponding to N sub-lines in said second direction; and said first sequence of comparison data from said half-tone print table are used to energize said heating elements in accordance with said half-tone image data of each pixel to be printed each time said heating elements are moved relative to said recording medium by an amount corresponding to one sub-line in said second direction so as to reproduce said tonal gradation.

14. A thermal printer as recited in claim 13, wherein said N is "3".

15. A thermal printer as recited in claim 14, further comprising a platen drum for carrying said recording medium, and a motor for rotating said platen drum.

16. A thermal printer as recited in claim 15, wherein said printer is a thermal wax transfer type printer wherein said heating elements heat the back surface of an ink film to transfer ink onto said recording medium.

17. A thermal printer as recited in claim 16, further comprising a strobe signal generator connected to said driver for determining the power conduction time period for each sub-line.

* * * * *